(12) United States Patent
Mizutani et al.

(10) Patent No.: US 6,580,194 B2
(45) Date of Patent: Jun. 17, 2003

(54) MOTOR HAVING NOISE LIMITER CIRCUIT

(75) Inventors: Nobuo Mizutani, Toyohashi (JP);
Wataru Kanou, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/935,679

(22) Filed: Aug. 24, 2001

(65) Prior Publication Data
US 2002/0030414 A1 Mar. 14, 2002

(30) Foreign Application Priority Data

Sep. 13, 2000 (JP) ........................................ 2000-278267
Dec. 8, 2000 (JP) ........................................ 2000-374763

(51) Int. Cl.⁷ ............................................. H02K 11/02
(52) U.S. Cl. ...................... 310/239; 310/68 R; 310/71; 310/72
(58) Field of Search ................................ 310/239, 238, 310/220, 67 R, 68 R, 71, 72, 68 C

(56) References Cited
U.S. PATENT DOCUMENTS 4,342,934 A * 8/1982 van Wijhe et al. .......... 307/105
4,851,730 A * 7/1989 Fushiya et al. ............. 310/239
5,041,751 A * 8/1991 Yokozuka .................... 310/239
5,453,646 A   9/1995 Gleixner et al. ............. 310/51

FOREIGN PATENT DOCUMENTS

| JP | 7-194063 | * 7/1995 | ........... H02K/11/02 |
| JP | A-11-122858 | 4/1999 | ........... H02K/5/00 |
| JP | A-2000-184661 | 6/2000 | ........... H02K/11/02 |

* cited by examiner

Primary Examiner—Burtons S. Mullins
(74) Attorney, Agent, or Firm—Posz & Bethards, PLC

(57) ABSTRACT

A motor includes an electrically conductive yoke housing and a noise limiter circuit. The yoke housing is configured in an oblate cylindrical cup form having a couple of opposed flat side walls and a couple of opposed arcuate side walls that join opposed lateral edges of the flat side walls together. The noise limiter circuit includes choke coils. Each choke coil is arranged adjacent to a corresponding corner of the yoke housing located between a corresponding one of the flat side walls and a corresponding one of the arcuate side walls in such a manner that each choke coil extends substantially parallel to a central axis of the yoke housing.

17 Claims, 6 Drawing Sheets

MOTOR HAVING NOISE LIMITER CIRCUIT

CROSS REFERENCE TO RELATED APPLICATION

This application is based on and incorporates herein by reference Japanese Patent Application No. 2000-278267 filed on Sep. 13, 2000 and Japanese Patent Application No. 2000-374763 filed on Dec. 8, 2000.

BACKGROUND OF THE INVENTION

1. Field of the Invention

The present invention relates a motor having a noise limiter circuit for restraining generation of electromagnetic noise between brushes and a commutator.

2. Description of Related Art

In general, electromagnetic noise is generated between brushes and a commutator during rotation of a direct current motor. When power supplied to the brushes includes a relatively large amount of noise, a relatively large amount of electromagnetic noise is generated. Thus, some previously proposed motors have a noise limiter circuit that includes capacitors, choke coils and the like to smooth the electric power supplied to the brushes.

To reduce a size (thickness) of such a motor, it has been proposed to use an oblate cylindrical housing having a smaller profile in comparison to a cylindrical housing. In order to further reduce the size of the motor having the oblate cylindrical housing, effective arrangement of the electronic components, such as the choke coils, within the housing has been demanded.

SUMMARY OF THE INVENTION

Thus, it is an objective of the present invention to provide a motor that allows a reduction in its size by effective arrangement of its components.

To achieve the objective of the present invention, there is provided a motor including an electrically conductive yoke housing and a noise limiter circuit. The yoke housing is configured in an oblate cylindrical cup form having two opposed flat side walls and two opposed arcuate side walls, each of which joins corresponding opposed lateral edges of the flat side walls together. The yoke housing has an open end at one end and receives a plurality of brushes and a commutator. The noise limiter circuit is arranged at the open end of the yoke housing and smoothes electric power to be supplied to the plurality of brushes to restrain generation of electromagnetic noise between the plurality of brushes and the commutator. The noise limiter circuit includes at least one of the following components: a plurality of helically wound cylindrical choke coils and a plurality of capacitors. Each choke coil is arranged adjacent to a corresponding corner of the yoke housing located between a corresponding one of the flat side walls and a corresponding one of the arcuate side walls in such a manner that each choke coil extends substantially parallel to a central axis of the yoke housing. The capacitors are arranged adjacent to a center of one of the flat side walls.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to the accompanying drawings.

Figure 1:
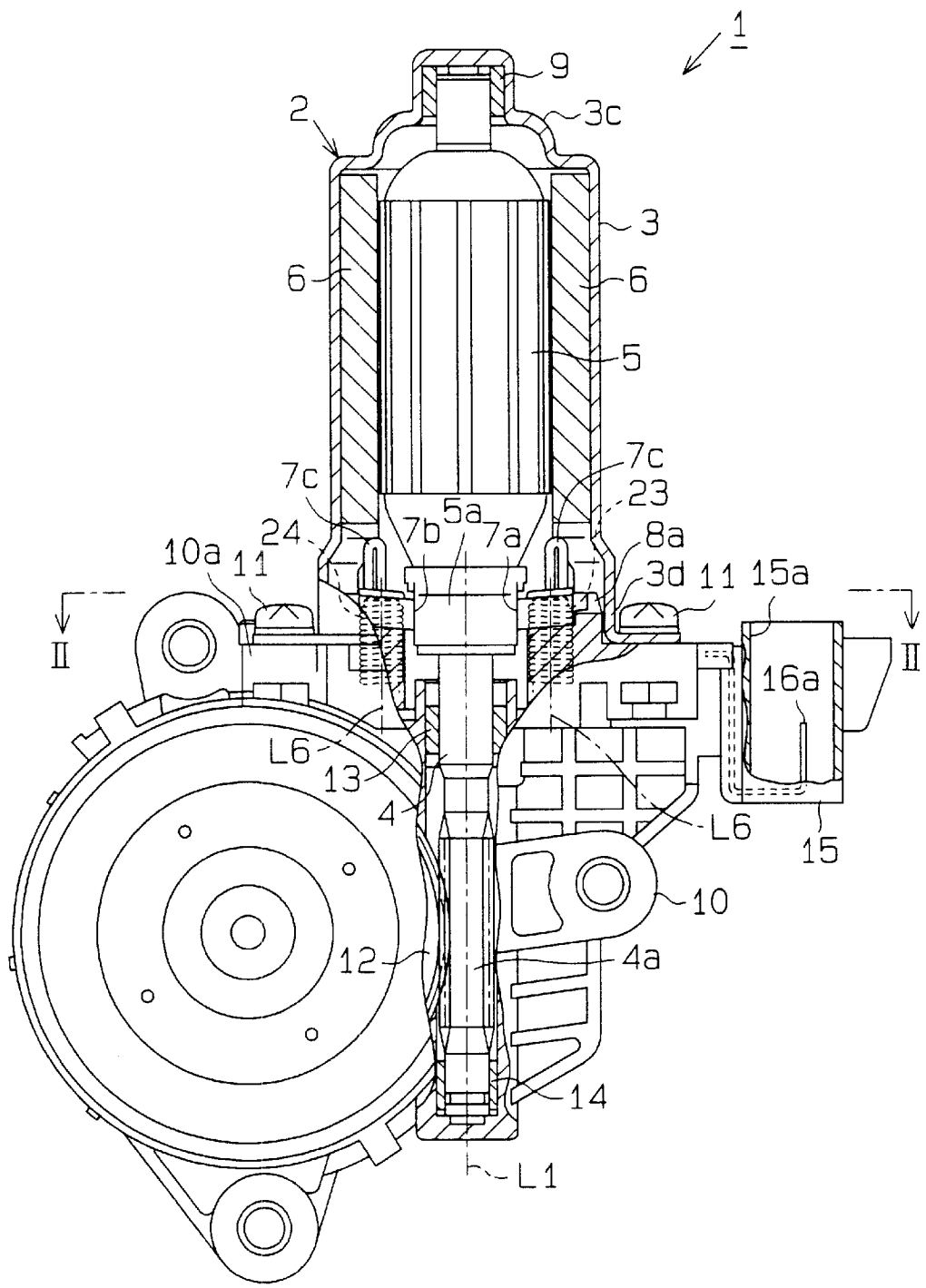
FIG. 1 is a partial cutaway plan view of a motor according to an embodiment of the present invention.

FIG. 1 shows a motor having a speed reducing mechanism according to the present embodiment. The motor 1 includes a motor unit 2 acting as a drive source of the motor 1. The motor unit 2 includes a yoke housing 3, a rotor 5, magnets 6 and a brush holder 8. The yoke housing 3 is made of an electrically conductive metal material. The rotor 5 includes a rotatable shaft 4. The brush holder 8 is made of a dielectric resin material and supports brushes 7a, 7b.

Figure 2:
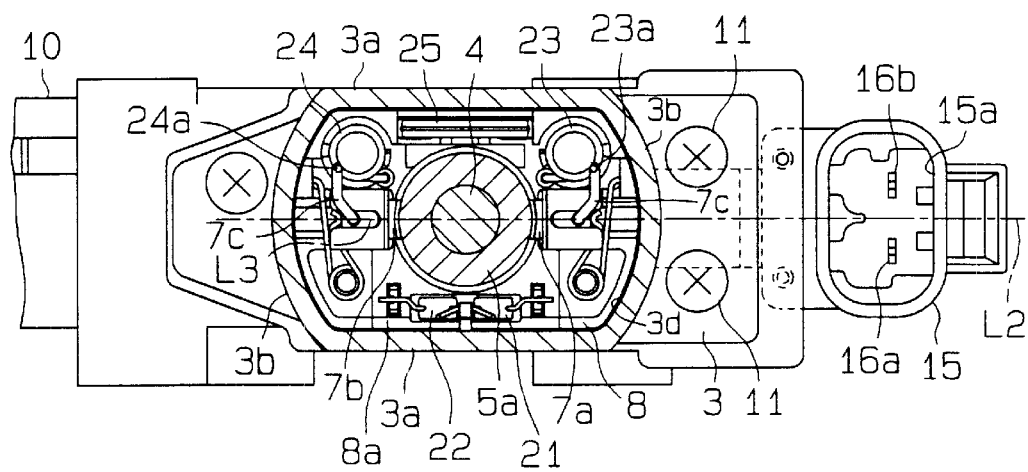
FIG. 2 is a cross-sectional view along line II—II in FIG. 1.
Figure 3:
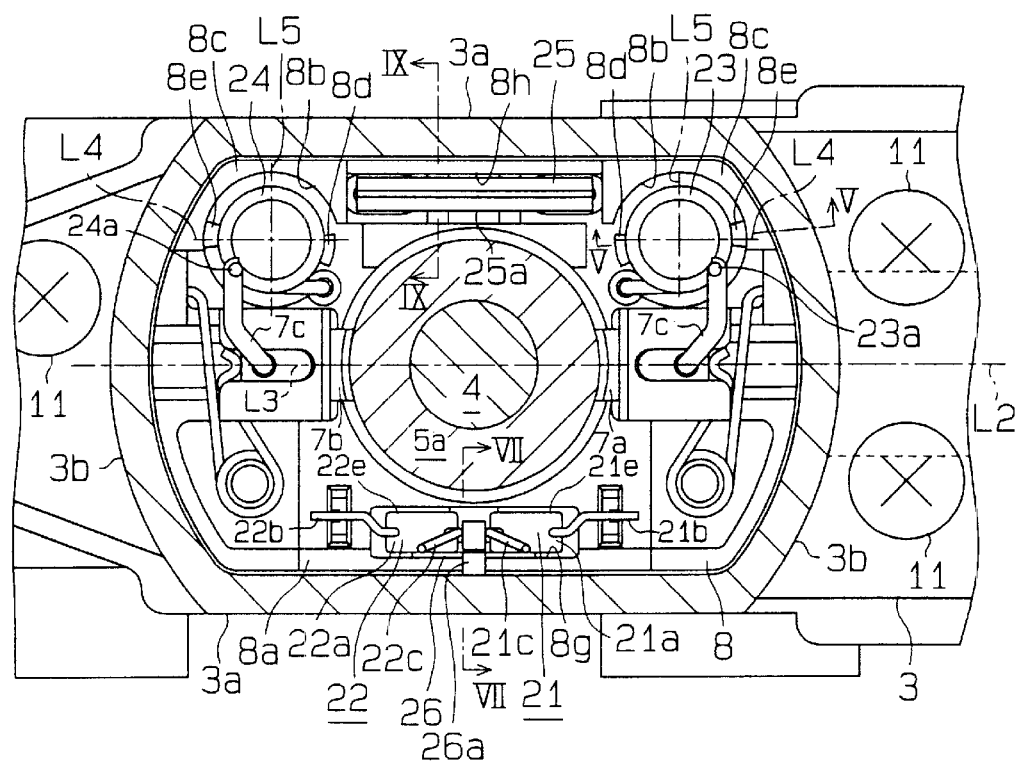
FIG. 3 is a partial enlarged cross-sectional view of FIG. 2.

The yoke housing 3 is configured in an oblate cylindrical cup form having an open end at one end and a closed end at the other end. As shown in FIGS. 2 and 3, the yoke housing 3 includes two opposed parallel flat side walls 3a and two opposed arcuate side walls 3b, each of which joins corresponding opposed lateral edges of the flat side walls 3a together. A bearing 9 is secured to a base 3c of the yoke housing 3 and rotatably supports a base end (top end in FIG. 1) of a rotatable shaft 4. A resin housing 10 made of a resin material is connected to the open end 3d of the yoke housing 3 with screws 11 and receives a portion of the rotatable shaft 4 which protrudes from the open end 3d of the yoke housing 3.

The resin housing 10 has a predetermined interior shape that allows the portion of the rotatable shaft 4, a worm wheel 12 and the like to be received therein. Two bearing 13, 14 are secured within the resin housing 10 and rotatably support a middle portion and a distal end portion (lower end in FIG. 1) of the rotatable shaft 4, respectively. A worm 4a is provided in the rotatable shaft 4 between the two bearings 13, 14. The worm 4a is meshed with the worm wheel 12, so that a rotational force of the worm 4a is transmitted in a direction perpendicular to a central axis L1 of the rotatable shaft 4.

The brush holder 8 is held between the open end 3d of the yoke housing 3 and a securing portion 10a of the resin housing 10 to which the yoke housing 3 is secured. The brush holder 8 has an engaging portion 8a that is fitted within the open end 3d of the yoke housing 3. Each brush 7a, 7b supported by the brush holder 8 slidably engages against a commutator 5a that is provided at an open end 3d side portion of the rotator 5.

Each brush 7a, 7b is shaped in a rectangular parallelepiped form. As shown in FIGS. 2 and 3, each brush 7a, 7b is held in such a manner that a longitudinal axis L3 of each brush 7a, 7b extends in a direction perpendicular to the central axis L1 of the yoke housing 3 (rotatable shaft 4) and coincides with a straight line L2 that extends through a center of each arcuate side wall 3b. With this arrangement, in the yoke housing 3, a relatively large space is provided in a widthwise direction (direction perpendicular to the straight line L2 in FIGS. 2 and 3) of the brushes 7a, 7b, so that it is still possible to accommodate larger brushes 7a, 7b within the yoke housing 3 without increasing the size of the yoke housing 3.

The brush holder 8 includes a power supply unit 15 integrally formed therein. The power supply unit 15 is exposed from the resin housing 10. In this case, the power supply unit 15 extends out of the resin housing 10 along the straight line L2 and then extends in a direction parallel to the central axis L1 of the yoke housing 3. That is, the power supply unit 15 is configured to extend in a direction (hereinafter referred to as a flat direction of the yoke housing 3) parallel to a plane of each flat side wall 3a of the yoke housing 3. The flat direction of the yoke housing 3 is also the flat direction of the motor 1, so that size (thickness) of the motor 1 can be reduced by making the power supply unit 15 to extend in the flat direction of the yoke housing 3.

Furthermore, power source terminals 16a, 16b are insert molded within the power supply unit 15 and are disposed within a connection recess 15a to allow connection between the power source terminals 16a, 16b and an external connector (not shown). The connection recess 15a has an open end that opens in the direction of the axis L1 at its top end in FIG. 1. That is, the connection recess 15a is equally connectable to both the external connector extending from a front side of the connection recess 15a toward the connection recess 15a along a direction perpendicular to the plane of FIG. 1 and the external connector extending from a rear side of the connection recess 15a toward the connection recess 15a along the direction perpendicular to the plane of FIG. 1. Thus, with this construction of the power supply unit 15, there is achieved a higher degree of freedom in terms of connecting direction of the motor 1. The power supply terminals 16a, 16b of the power supply unit 15 are electrically connected to the brushes 7a, 7b, respectively, to supply the electrical power.

Figure 10:
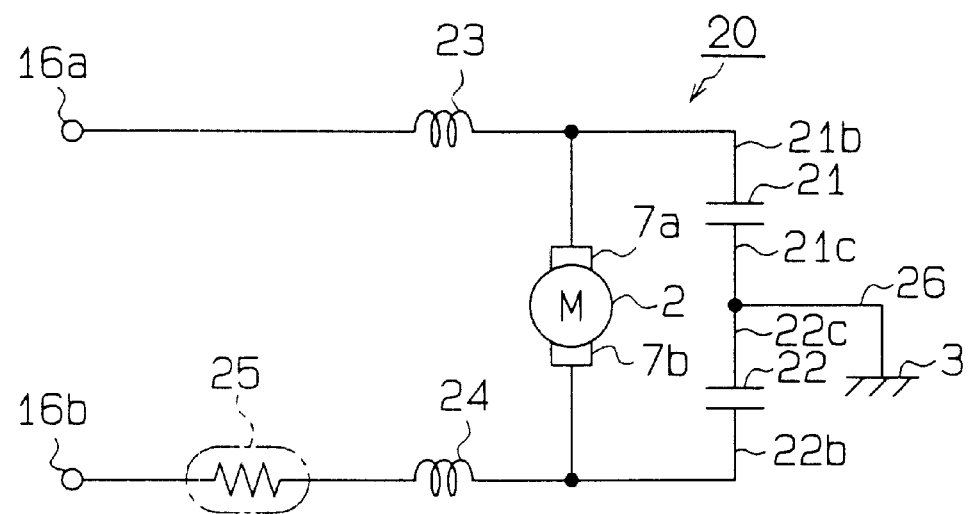
FIG. 10 is a circuit diagram of a noise limiter circuit of the embodiment.

With reference to FIGS. 2 and 3, the brush holder 8 includes a circuit board (not shown) integrated therein. Two capacitors 21, 22, two choke coils 23, 24, a circuit breaker (PTC: Positive Temperature Coefficient) 25 and the like are arranged on the circuit board. As shown in FIG. 10, the capacitors 21, 22 and the choke coils 23, 24 constitute a noise limiter circuit 20 for limiting or restraining generation of electromagnetic noise between the brushes 7a, 7b and the commutator 5a. The noise limiter circuit 20 is arranged between the brushes 7a, 7b and the power supply terminals 16a, 16b that supply the electrical power to the brushes 7a, 7b.

That is, the brush 7a is connected to the power supply terminal 16a through the choke coil 23, and the brush 7b is connected to the power supply terminal 16b through the choke coil 24 and the circuit breaker 25. The brush 7a is electrically connected to the yoke housing 3 through the capacitor 21, and the brush 7b is electrically connected to the yoke housing 3 through the capacitor 22. The capacitors 21, 22 and the choke coils 23, 24 smooth the power to be supplied to the brushes 7a, 7b and thereby restrain a large voltage change while the brushes 7a, 7b slidably engage against the commutator 5a. Thus, the capacitors 21, 22 and the choke coils 23, 24 restrain generation of electromagnetic noise between the brushes 7a, 7b and the commutator 5a.

As shown in FIGS. 1 to 3, each choke coil 23, 24 is helically wound into a cylindrical form and centrally receives a core secured therein. Each choke coil 23, 24 has a length greater than its diameter. One end of each choke coil 23, 24 is solder-bonded to the circuit board integrated in the brush holder 8 to make electrical connection to the corresponding power source terminal 16a, 16b, and the other end of each choke coil 23, 24 is connected to the corresponding brush 7a, 7b through a pig tail 7c. In this case, the other end 23a, 24a of each choke coil 23, 24 is positioned adjacent to the corresponding brush 7a, 7b but is spaced away from the commutator 5a. Specifically, as shown in FIG. 3, two central lines L4, L5 extend through the center of each choke coil 23, 24 in crisscross fashion. Among these central lines L4, L5, one central line L4 extends parallel to the straight line L2 through the center of the choke coil 23, 24, and the other central line L5 extends perpendicular to the one central line L4 through the center of the choke coil 23, 24. The other end 23a, 24a of each choke coil 23, 24 is positioned in such a manner that the other end 23a, 24a of each choke coil 23, 24 is located on the same side of the one central line L4 as the corresponding brush 7a, 7b and is also located on an opposite side of the central line L5 with respect to the commutator 5a. That is, each pig tail 7c connected to the other end 23a, 24a of each choke coil 23, 24 is spaced away from the commutator 5a and is prevented from contacting the commutator 5a to restrain short-circuiting therebetween. Each choke coil 23, 24 is arranged in such a manner that an axial line L6 of the choke coil 23, 24 extends parallel to the central axis L1 of the yoke housing 3 (rotatable shaft 4) at a corresponding corner of the yoke housing 3 between the corresponding flat side wall 3a and the corresponding arcuate side wall 3b.

That is, the choke coils 23, 24 are the relatively large electronic components in comparison to the capacitors 21, 22 and are arranged at the corners of the yoke housing 3 where a relatively large space can be provided between each choke coil 23, 24 and the commutator 5a. In this way, effective use of the internal space of the yoke housing 3 can be achieved. Furthermore, since the choke coils 23, 24 having the length greater than its diameter are arranged to extend parallel to the central axis L1 of the yoke housing 3 (rotatable shaft 4), the choke coils 23, 24 occupy a minimum portion of a cross-section of the yoke housing 3 that is located in a plane perpendicular to the central axis L1 of the yoke housing 3.

Figure 4:
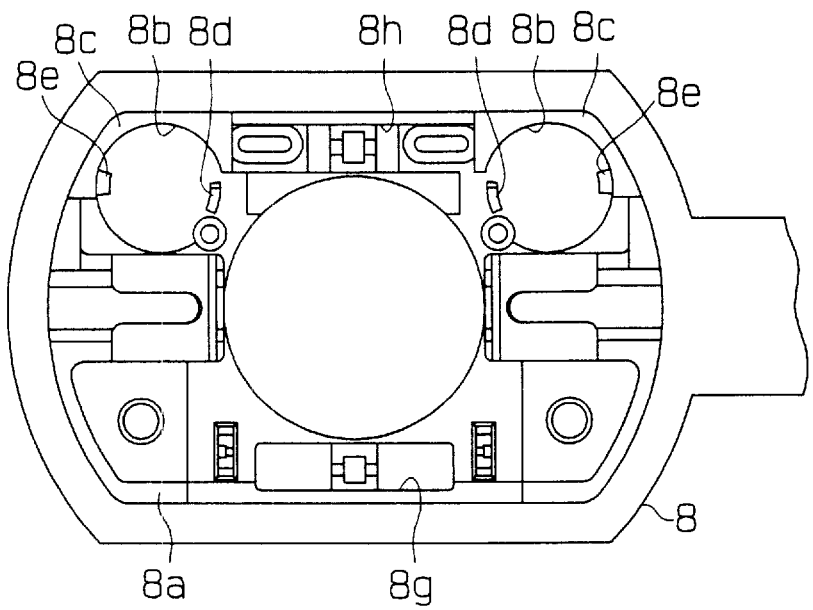
FIG. 4 is a schematic enlarged view of a brush holder of the motor.
Figure 5:
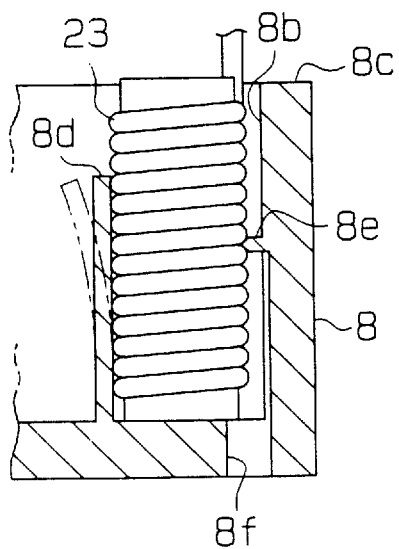
FIG. 5 is a cross-sectional view along line V—V in FIG. 3.

Furthermore, as shown in FIG. 4, the brush holder 8 includes a couple of choke coil receiving portions 8b for receiving and positioning the corresponding choke coils 23, 24. As shown in FIG. 5, each choke coil receiving portion 8b has an axial depth that is greater than the axial length of the main body (cylindrical portion) of the corresponding choke coil 23, 24, so that the main body of the choke coil 23, 24 received within the choke coil receiving portion 8b does not protrude from the choke coil receiving portion 8b. In this way, contact between each choke coil 23, 24 and the other component (e.g., the yoke housing 3, the commutator 5a or the like) is prevented, thereby improving the insulation of each choke coil 23, 24.

Each choke coil receiving portion 8b includes a resilient piece 8d and an outer lateral wall 8c to be engaged with the yoke housing 3. A protrusion 8e is formed in an axial center portion of an inner peripheral surface of the outer lateral wall 8c which opposes the resilient piece 8d. When each choke coil 23, 24 is received within the corresponding choke coil receiving portion 8b before solder-bonding the choke coil 23, 24, the protrusion 8e engages between adjacent outer ridges of the choke coil 23, 24. The resilient piece 8d keeps the engaged state of the protrusion 8e by exerting an urging force against the choke coil 23,24 and urging the choke coil 23, 24 against the outer lateral wall 8c, as shown in FIG. 5. Thus, before solder-bonding each choke coil 23, 24, the choke coil 23, 24 is prevented from moving out of the choke coil receiving portion 8b by the protrusion 8e and the resilient piece 8d, thereby allowing easier solder-bonding operation of the choke coil 23, 24.

Figure 6:
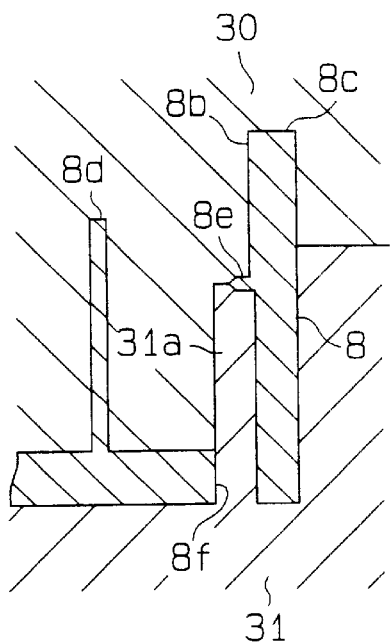
FIG. 6 is a schematic view showing a molding operation of a choke coil receiving portion of the brush holder.

With reference to FIG. 6, the brush holder 8 is molded by an upper die 30 and a lower die 31. Each choke coil receiving portion 8b is molded by a corresponding portion of the upper die 30 and a corresponding portion of the lower die 31. In the lower die 31, a projection 31a is provided. The projection 31a extends in an axial direction of the choke coil receiving portion 8b and penetrates through a bottom surface of the choke coil receiving portion 8b, so that a through hole 8f is formed through the bottom surface of each choke coil receiving portion 8b of the molded brush holder 8. In the present embodiment, the protrusion 8e is molded between a distal end surface of the projection 31a and the upper die 30.

Figure 8:
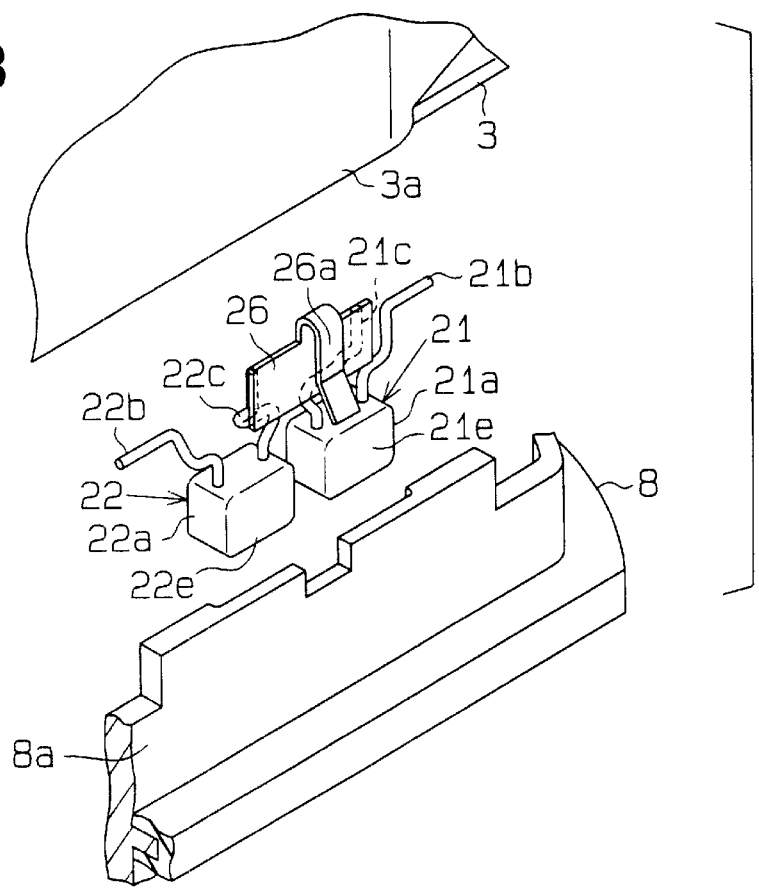
FIG. 8 is a partial exploded perspective view showing capacitors to be installed in the brush holder.

As shown in FIG. 8, each capacitor 21, 22 includes a main body 21a, 22a of a rectangular parallelepiped shape and two wire-shaped legs 21b, 21c, 22b, 22c extending from the main body 21a, 22a. One leg 21b, 22b of each capacitor 21, 22 acts as a brush-side terminal that is connected to the corresponding brush 7a, 7b, and the other leg 21c, 22c of each capacitor 21, 22 acts as a ground-side terminal. The two wire-shaped legs 21b, 21c, 22b, 22c of each capacitor 21, 22 are arranged along a direction (hereinafter referred to as a flat direction of the main body 21a, 22a) parallel to a plane of a flat surface portion 21e, 22e of the main body 21a, 22a.

Figure 7:
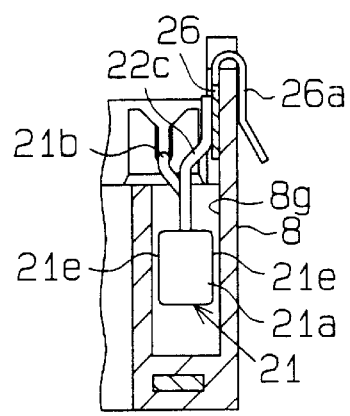
FIG. 7 is a cross-sectional view along line VII—VII in FIG. 3.

As shown in FIG. 4, the brush holder 8 also includes a capacitor receiving portion 8g for receiving and positioning the capacitors 21, 22 therein. As shown in FIG. 7, an axial depth of the capacitor receiving portion 8g is greater than an axial length of the main body 21a, 22a of each capacitor 21, 22, so that the capacitors 21, 22 received in the capacitor receiving portion 8g do not protrude from the capacitor receiving portion 8g. In this way, contact between the capacitors 21, 22 and the other components (e.g., the yoke housing 3, the commutator 5a or the like) is prevented, thereby improving insulation of the capacitors 21,22.

The one leg (brush-side terminal) 21b, 22b of each capacitor 21, 22 is connected to a corresponding connector element extending from the circuit board integrally formed in the brush holder 8. The capacitors 21, 22 are substantially arranged at the center of the flat side wall 3a that is located on the opposite side of the commutator 5a with respect to the choke coils 23, 24.

That is, the capacitors 21, 22 are the relatively small electronic components in comparison to the choke coils 23, 24. Thus, effective use of the internal space of the yoke housing 3 is advantageously achieved by arranging the capacitors 21, 22 in a small space located between the center of the flat side wall 3a and the commutator 5a. Furthermore, the capacitors 21, 22 are arranged in such a manner that the flat direction of the main body 21a, 22a of each capacitor 21, 22 is substantially parallel to a plane of the flat side wall 3a, and the legs 21b, 21c, 22b, 22c of each capacitor 21, 22 are arranged along the direction parallel to the plane of the flat side wall 3a. Thus, an increase in the accommodating space for accommodating the capacitors 21, 22 in the cross-section of the yoke housing 3 located in the plane perpendicular to the central axis L1 of the yoke housing 3, is substantially restrained.

Furthermore, as shown in FIG. 8, the other legs (ground-side leg) 21c, 22c of the capacitors 21, 22 are commonly solder-bonded to a single connector plate 26. The connector plate 26 has a connector element 26a. The connector element 26a is disposed outside of the engaging portion 8a and is electrically connected to an inner side of the flat side wall 3a of the yoke housing 3. Thus, when the engaging portion 8a of the brush holder 8 is fitted within the yoke housing 3, the connector plate 26 (connector element 26a) is electrically connected to the yoke housing 3, i.e., the legs (ground-side terminals) 21c, 22c of the capacitors 21, 22 are electrically connected to the yoke housing 3.

As shown in FIGS. 2 and 3, the circuit breaker 25 is solder-bonded to the circuit board integrally formed in the brush holder 8 and is generally positioned at the center of the flat side wall 3a located on the other side of the commutator 5a with respect to the capacitors 21, 22. The circuit breaker 25 is the electronic component that is shaped in a flat rectangular parallelepiped form having a flat portion 25a. Thus, the circuit breaker 25 can be arranged in a small space defined between the center portion of the flat side wall 3a and the commutator 5a in such a manner that a plane of the flat portion 25a of the circuit breaker 25 extends substantially parallel to the plane of the flat side wall 3a, thereby improving the efficiency of the internal space of the yoke housing 3.

Figure 9:
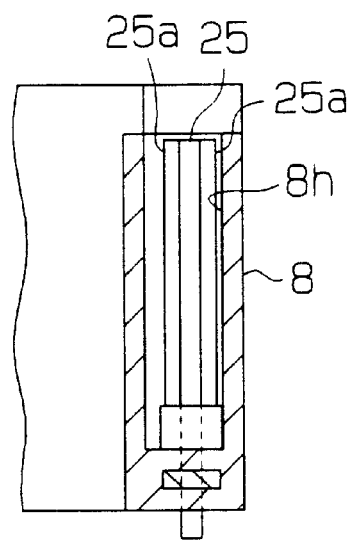
FIG. 9 is a cross-sectional view along line IX—IX in FIG. 3.

As shown in FIG. 4, the brush holder 8 includes a circuit breaker receiving portion 8h for receiving and positioning the circuit breaker 25 therein. As shown in FIG. 9, an axial depth of the circuit breaker receiving portion 8h is greater than an axial length of a main body of the circuit breaker 25, so that the circuit breaker 25 received in the circuit breaker receiving portion 8h does not protrude from the circuit breaker receiving portion 8h. In this way, contact between the circuit breaker 25 and the other components (e.g., the yoke housing 3, the commutator 5a or the like) is prevented, thereby improving insulation of the circuit breaker 25.

As described above, the present embodiment provides the following advantages.

(1) Each choke coil 23, 24, which constitutes the noise limiter circuit 20, is arranged in such a manner that the axial line L6 of the choke coil 23, 24 extends substantially parallel to the central axis L1 of the yoke housing 3 at the corresponding corner of the yoke housing 3 between the corresponding flat side wall 3a and the corresponding arcuate side wall 3b. Since the rotor 5 (commutator 5a) is arranged at the center of the yoke housing 3, the corner between the flat side wall 3a and the arcuate side wall 3b is the place where the relatively large space can be provided between the rotor 5 (commutator 6a) and the corresponding choke coil 23, 24. Thus, since the choke coils 23, 24 are the relatively large components with respect to the capacitors 21, 22, it is possible to improve the efficiency of the internal space of the yoke housing 3 by positioning each choke coil 23, 24 at the corresponding corner between the corresponding flat side wall 3a and the arcuate side wall 3b. Thus, a size of the cross-section of the yoke housing 3 (an opening size of the open end of the yoke housing 3) located in the plane perpendicular to the central axis L1 of the yoke housing 3 can be reduced, thereby allowing a reduction in the size of the motor 1. Furthermore, since this type of choke coil 23, 24 is generally cylindrical and has the axial length greater than its diameter, it is possible to substantially restrain an increase in the accommodating space for accommodating the choke coils 23, 24 in the plate perpendicular to the central axis L1 of the yoke housing 3 by arranging the choke coil 23, 24 parallel to the central axis L1 of the yoke housing 3.

(2) The capacitors 21, 22, which constitute the noise limiter circuit 20, are arranged adjacent to the center of the flat side wall 3a of the yoke housing 3. As described above, the rotor 5 (commutator 5a) is arranged in the center of the yoke housing 3, so that the center of the flat side wall 3a of the yoke housing 3 is the narrow portion where the space between the center of the flat side wall 3a and the rotor 5 (commutator 5a) is small. Thus, since the capacitors 21, 22 are the relatively small electronic components in comparison to the choke coils 23, 24, it is possible to improve the efficiency of the internal space of the yoke housing 3 by arranging the capacitors 21, 22 at the center of the flat side wall 3a, thereby allowing a reduction in the size of the motor 1.

(3) The circuit breaker 25 is generally arranged at the center of the flat side wall 3a that opposes the flat side wall 3a at which the capacitors 21, 22 are arranged. Similar to the space between the capacitors 21, 22 and the rotor 5 (commutator 5a), this is also the narrow portion where the space between the circuit breaker 25 and the rotor 5 (commutator 5a) is small. However, since the circuit breaker 25 has the flat rectangular parallelepiped form, it is possible to improve the efficiency of the internal space of the yoke housing 3 by positioning the circuit breaker 25 in this narrow portion, thereby allowing further reduction in the size of the motor 1.

(4) Since the choke coils 23, 24 are received in the choke coil receiving portion 8b provided in the brush holder 8, it is not required to provide a dedicated separate component for supporting the choke coils 23, 24, thereby allowing reduction in the number of the components and also reduction in the number of assembling steps. Since the choke coils 23, 24 are received in the choke coil receiving portions 8b, the choke coils 23, 24 can be appropriately positioned. In this way, contact between each choke coil 23, 24 and the other component can be prevented, thereby restraining damage to the choke coils 23, 24 and improving the insulation of each choke coil 23, 24.

(5) Each choke coil receiving portion 8b includes the protrusion 8e, which engages between adjacent outer ridges of the choke coil 23, 24, and the resilient piece 8d, which extends in the axial direction of the choke coil 23, 24 on the opposite side of the choke coil 23, 24 with respect to the protrusion 8e. Thus, before solder-bonding each choke coil 23, 24 received in the corresponding choke coil receiving portion 8b, the protrusion 8e engages between the adjacent outer ridges of the choke coil 23, 24, and this engagement of the protrusion 8d is maintained by the resilient force of the resilient piece 8d. Thus, before solder-bonding each choke coil 23, 24, the choke coil 23, 24 is prevented from moving out of the choke coil receiving portion 8b by the protrusion 8e and the resilient piece 8d, thereby allowing easier solder-bonding operation of the choke coil 23, 24.

(6) The capacitors 21, 22 are received within the capacitor receiving portion 8g provided in the brush holder 8, so that it is not required to provide a dedicated separate component for supporting the capacitors 21, 22, thereby allowing reduction in the number of the components and also reduction in the number of assembling steps. Since the capacitors 21, 22 are received within the capacitor receiving portion 8g, the capacitors 21, 22 can be appropriately positioned. In this way, contact between each capacitor 21, 22 and the other component is prevented, thereby restraining damage to each capacitor 21, 22 and improving the insulation of each capacitor 21, 22.

(7) The leg (ground-side terminal) 21c, 22c of each capacitor 21, 22 is electrically connected to the yoke housing 3 through the connector plate 26 when the brush holder 8 is installed in the open end of the yoke housing 3. Thus, a separate step of electrically connecting the leg 21c, 22c (ground-side terminal) of the capacitor 21, 22 to the yoke housing 3 is not required.

(8) Each brush 7a, 7b is arranged in such a manner that the longitudinal axis L3 of each brush 7a, 7b extends perpendicular to the central axis L1 of the yoke housing 3 (rotatable shaft 4) and generally coincides with the straight line L2 that passes through the center of each arcuate side wall 3b of the yoke housing 3. For example, if each brush 7a, 7b is designed to be positioned at the corner of the yoke housing 3 between the flat side wall 3a and the arcuate side wall 3b and needs to be increased in the size in the widthwise direction of the brush 7a, 7b, a sufficient space cannot be provided between the flat side wall 3a and the flat side wall 3a side of the brush 7a, 7b. Thus, it is difficult to allow the required increase in the size of the brush 7a, 7b, for example, by changing the holding position of each brush 7a, 7b. However, in the present embodiment, since a relatively large space can be provided in the widthwise direction of the brush 7a, 7b, it is relatively easy to meet the required increase in the size of the brush 7a, 7b.

The present embodiment can be modified as follows.

In the above embodiment, as shown in FIGS. 1 to 3, although the cylindrical choke coils 23, 24 are used, each choke coil 23, 24 needs not be completely cylindrical. For example, each choke coil 23, 24 may be helically wound into a tube form having an ellipsoidal cross-section.

In the above embodiment, although the choke coils 23, 24 are arranged at the positions depicted in FIGS. 1 to 3, the positions of the choke coils 23, 24 are not limited to those depicted in FIGS. 1 to 3. For example, the choke coils 23, 24 can be arranged at diagonally opposed corners of the yoke housing 3.

In the above embodiment, the main body 21a, 22a of each capacitor 21, 22 is shaped in the rectangular parallelepiped form. Furthermore, the legs 21b, 21c, 22b, 22c of each capacitor 21, 22 are shaped in the wire form and are arranged along the flat direction of the main body 21a, 22a. However, it is not essential to use such a capacitor 21, 22. For example, each capacitor may have a main body shaped in a cylindrical form. Also, each leg of the capacitor may be shaped in a plate form. Furthermore, it is not essential to arrange the legs 21b, 21c, 22b, 22c of each capacitor 21, 22 along the flat direction of the main body 21a, 22a.

In the above embodiment, the capacitors 21, 22 are arranged in such a manner that the flat direction of the main body 21a, 22a of each capacitor 21, 22 is substantially parallel to the plane of the flat side wall 3a of the yoke housing 3. However, the present invention is not limited to this arrangement.

Figure 11:
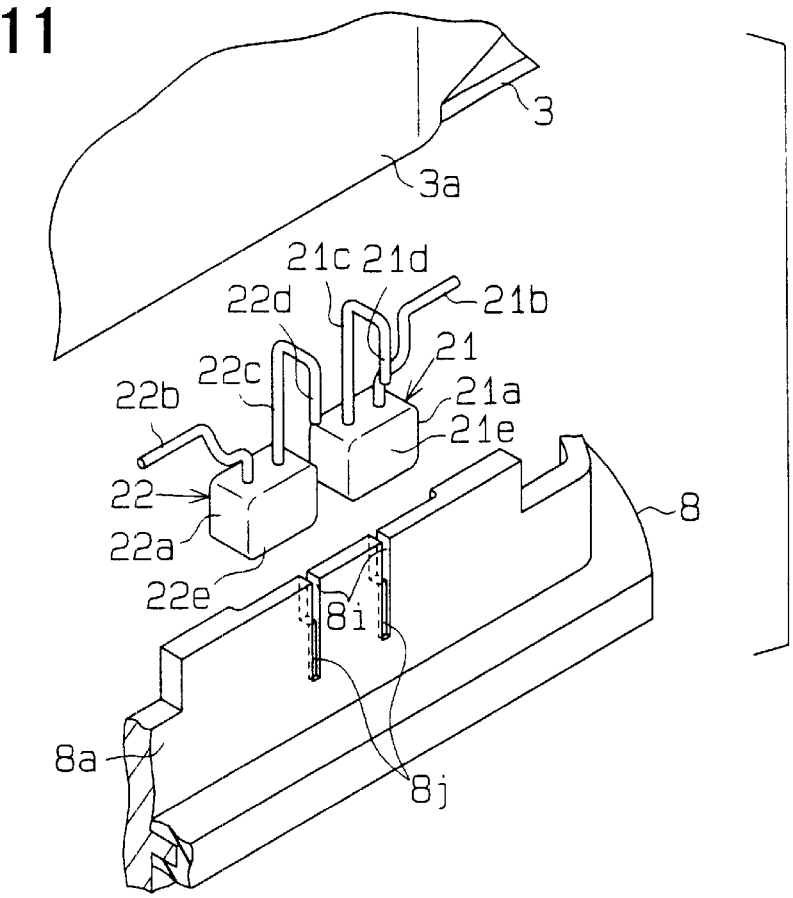
FIG. 11 is a partial exploded perspective view showing a modification of FIG. 8.

In the above embodiment, although the other leg 21c, 22c of each capacitor 21, 22, which acts as the ground-side terminal, is electrically connected to the yoke housing 3 through the connector plate 26, the other leg 21c, 22c can be directly electrically connected to the yoke housing 3. For example, as shown in FIG. 11, the other leg (ground-side terminal) 21c, 22c of each capacitor 21, 22 may be exposed outside of the engaging portion 8a through a corresponding slit 8i arranged in the engaging portion 8a, and a distal end portion 21d, 22d of the leg 21c, 22c of each capacitor 21, 22 may be received in a corresponding receiving groove 8j that continuously extends from the slit 8i. The distal end portion 21d, 22d protrudes slightly outwardly from an outer side surface of the engaging portion 8a. Thus, when the engaging portion 8a of the brush holder 8 is inserted within the yoke housing 3, the distal end portion 21d, 22d of the leg 21c, 22c of each capacitor 21, 22 is resiliently engaged against the inner side surface of the flat side wall 3a of the housing 3. Even with this arrangement, the leg 21c, 22c of each capacitor 21, 22 can be electrically connected to the yoke housing 3 when the brush holder 8 is received in the open end of the yoke housing 3. Thus, the step of electrically connecting the leg 21c, 22c of each capacitor 21, 22 to the yoke housing 3 is not required. Furthermore, a dedicated separate component for electrically connecting the leg (ground-side terminal) 21c, 22c of each capacitor 21, 22 to the yoke housing 3 is not required, thereby allowing reduction in the number of components and reduction in the number of the assembling steps. In this case, the receiving grooves 8j is not essential and can be eliminated.

In the above embodiment, each one of the choke coils 23, 24 and the capacitors 21, 22 is received and supported in the corresponding receiving portion 8b, 8g, 8h of the brush holder 8. The shape of each receiving portion 8b, 8g, 8h is not limited to the above described shape. For example, the choke coil receiving portion 8b may have an inner diameter that is substantially the same as the outer diameter of the corresponding choke coil 23, 24, and the protrusion 8e may be eliminated. The choke coil 23, 24 received in this receiving portion 8b may be retained in place by the urging force of the resilient piece 8d acting against the choke coil 23, 24 toward the outer lateral wall 8c. Furthermore, the choke coils 23, 24 and the capacitors 21, 22 may be supported by any component, such as the resin housing 10, other than the brush holder 8.

In the above embodiment, although the noise limiter circuit 20 includes the two choke coils 23, 24 and the two capacitors 21, 22, any other arrangement can be used for the noise limiter circuit 20. For example, a resistor may be added to the noise limiter circuit 20. Alternatively, it is possible to eliminate the choke coils 23, 24 or the capacitors 21, 22 from the noise limiter circuit 20.

Figure 12:
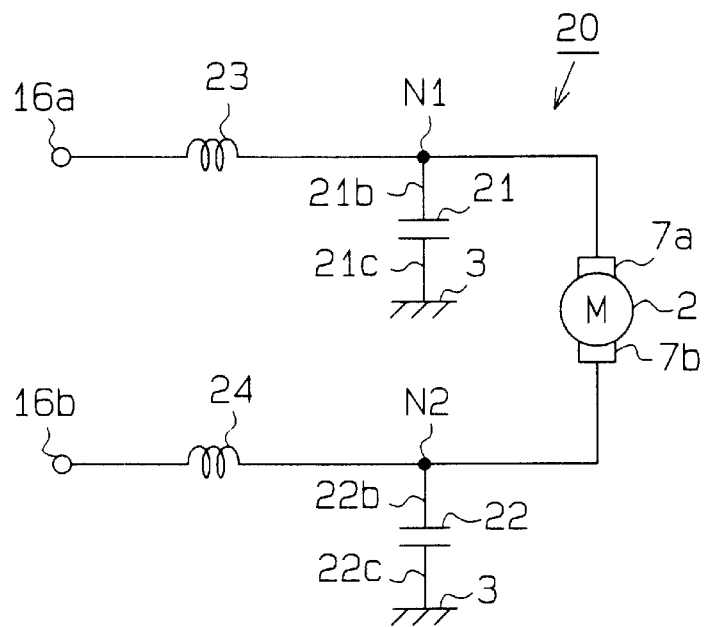
FIG. 12 is a circuit diagram showing a modification of the noise limiter circuit shown in FIG. 10.

Furthermore, the noise limiter circuit 20 shown in FIG. 10 may be modified as shown in FIG. 12. In the noise limiter circuit 20 shown in FIG. 12, the circuit breaker 25 is eliminated. Also, the one leg 21b, 22b of each capacitor 21, 22 is connected to a node N1, N2 located between the choke coil 23, 24 and the brush 7a, 7b, and the other leg 21c, 22c of each capacitor 21, 22 is connected to the yoke housing 3.

In the above embodiment, although the brushes 7a, 7b are arranged in such a manner that the longitudinal axis L3 of each brush 7a, 7b extends perpendicular to the central axis L1 of the yoke housing 3 (rotatable shaft 4), the longitudinal axis L3 of each brush 7a, 7b may be inclined with respect to the central axis L1 of the yoke housing 3 (rotatable shaft 4). That is, the longitudinal axis L3 of each brush 7a, 7b only needs to intersect the central axis L1.

In the above embodiment, although the connection recess 15a of the power supply unit 15 has the opening that opens in the direction of the central axis L1 of the yoke housing 3, the opening of the connection recess 15a may open in any other suitable direction.

In the above embodiment, although the power supply unit 15 extends in the flat direction of the yoke housing 3, the power supply unit 15 may extend in any other suitable direction.

In the above embodiment, although the power supply unit 15 is integrally formed in the brush holder 8, the power supply unit 15 may be formed separately from the brush holder 8.

In the above embodiment, although the present invention is implemented in the motor 1 having the speed reducing mechanism, the present invention can be implemented in any other motor of a different structure, such as a motor having no speed reducing mechanism. Furthermore, the present invention may be implemented in a motor having more than two brushes.

Additional advantages and modifications will readily occur to those skilled in the art. The invention in its broader terms is therefore, not limited to the specific details, representative apparatus, and illustrative examples shown and described.

What is claimed is:

1. A motor comprising:

an electrically conductive yoke housing configured in an oblate cylindrical cup form having two opposed flat side walls and two opposed arcuate side walls, each of which joins corresponding opposed lateral edges of said flat side walls together, wherein said yoke housing has an open end at one end and receives a plurality of brushes and a commutator, and each one of said plurality of brushes is arranged in such a manner that a longitudinal axis of said each one of said plurality of brushes extends perpendicular to said central axis of said yoke housing and generally coincides with a straight line extending through a center of each one of said arcuate side walls; and a noise limiter circuit arranged at said open end of said yoke housing and smoothing electric power to be supplied to said plurality of brushes to restrain generation of electromagnetic noise between said plurality of brushes and said commutator, said noise limiter circuit including at least one of the following:

a plurality of helically wound cylindrical choke coils, each said choke coil being arranged adjacent to a corresponding corner of said yoke housing located between a corresponding one of said flat side walls and a corresponding one of said arcuate side walls in such a manner that said each choke coil extends substantially parallel to a central axis of said yoke housing; and a plurality of capacitors, which are arranged adjacent to a center of one of said flat side walls and are arranged side by side along an internal surface of said one of said flat side walls.

2. A motor according to claim 1, further including a circuit breaker, wherein:

said noise limiter circuit includes said plurality of capacitors; and said circuit breaker arranged adjacent to a center of a second one of said flat side walls different than said one of said flat walls associated with said plurality of capacitors.

3. A motor according to claim 1, further including a brush holder inserted in said open end of said yoke housing, said brush holder holding said plurality of brushes in place with respect to said commutator, said brush holder being made of dielectric resin material.

4. A motor according to claim 3, wherein:
   said noise limiter circuit includes said plurality of choke coils; and
   said brush holder has a plurality of choke coil receiving portions, each said choke coil receiving portion receiving a corresponding one of said choke coils.

5. A motor according to claim 4, wherein an axial depth of said each choke coil receiving portion of said brush holder is greater than an axial length of a main body of said corresponding one of said choke coils.

6. A motor according to claim 3, wherein:
   said noise limiter circuit includes said plurality of capacitors; and
   said brush holder includes a capacitor receiving portion for receiving said plurality of capacitors.

7. A motor according to claim 6, wherein an axial depth of said capacitor receiving portion is greater than an axial length of a main body of each said capacitor.

8. A motor according to claim 3, wherein said brush holder includes a circuit breaker receiving portion for receiving said circuit breaker.

9. A motor according to claim 8, wherein an axial depth of said circuit breaker receiving portion is greater than an axial length of a main body of said circuit breaker.

10. A motor according to claim 3, wherein:
    said noise limiter circuit includes said plurality of capacitors;
    each of said plurality of capacitors includes a brush-side terminal and a ground-side terminal, said brush-side terminal being electrically connected to a corresponding one of said plurality of brushes, said ground-side terminal being electrically connected to said yoke housing; and
    said each of said plurality of capacitors is arranged in such a manner that said ground-side terminal of said each of said plurality of capacitors is electrically connected to said yoke housing when said brush holder is inserted in said open end of said yoke housing.

11. A motor according to claim 10, wherein:
    said brush-side terminal and said ground-side terminal of said each capacitor are arranged along a direction parallel to a plane of said one of said flat side walls; and
    said ground-side terminal of said each capacitor is electrically connected to said one of said flat side walls.

12. A motor according to claim 1, wherein:
    said noise limiter circuit includes said plurality of choke coils and said plurality of capacitors;
    said plurality of brushes include two brushes;
    said plurality of choke coils include two choke coils; and
    said plurality of capacitors include two capacitors.

13. A motor comprising:
    an electrically conductive yoke housing configured in an oblate cylindrical cup form having two opposed flat side walls and two opposed arcuate side walls, each of which joins corresponding opposed lateral edges of said flat side walls together, said yoke housing having an open end at one end and receiving a plurality of brushes and a commutator;
    a noise limiter circuit arranged at said open end of said yoke housing and smoothing electric power to be supplied to said plurality of brushes to restrain generation of electromagnetic noise between said plurality of brushes and said commutator, said noise limiter circuit including at least one of the following:
        a plurality of helically wound cylindrical choke coils, each said choke coil being arranged adjacent to a corresponding corner of said yoke housing located between a corresponding one of said flat side walls and a corresponding one of said arcuate side walls in such a manner that said each choke coil extends substantially parallel to a central axis of said yoke housing; and
        a plurality of capacitors arranged adjacent to a center of one of said flat side walls; and
    a brush holder inserted in said open end of said yoke housing, said brush holder holding said plurality of brushes in place with respect to said commutator, said brush holder being made of dielectric resin material, wherein:
        said noise limiter circuit includes said plurality of choke coils;
        said brush holder has a plurality of choke coil receiving portions, each said choke coil receiving portion receiving a corresponding one of said choke coils; and
        said each choke coil receiving portion of said brush holder includes a resilient piece for holding said corresponding one of said choke coils by exerting an urging force against said corresponding one of said choke coils.

14. A motor according to claim 13, wherein said each choke coil receiving portion of said brush holder includes a protrusion that is positioned on an opposite side of said corresponding one of said choke coils with respect to said resilient piece and engages against said corresponding one of said choke coils to hold said corresponding one of said choke coils in cooperation with said resilient piece.

15. A motor according to claim 1, wherein:
    said noise limiter circuit includes said plurality of helically wound cylindrical choke coils and said plurality of capacitors; and
    said plurality of helically wound cylindrical choke coils is arranged adjacent to a second one of said flat side walls.

16. A motor comprising:
    an electrically conductive yoke housing configured in an oblate cylindrical cup form having two opposed flat side walls and two opposed arcuate side walls, each of which joins corresponding opposed lateral edges of said flat side walls together, said yoke housing having an open end at one end and receiving a plurality of brushes and a commutator; and
    a noise limiter circuit arranged at said open end of said yoke housing and smoothing electric power to be supplied to said plurality of brushes to restrain generation of electromagnetic noise between said plurality of brushes and said commutator, said noise limiter circuit including:
        a plurality of helically wound cylindrical choke coils, each said choke coil being arranged adjacent to a corresponding corner of said yoke housing located between a corresponding one of said flat side walls and a corresponding one of said arcuate side walls in such a manner that said each choke coil extends substantially parallel to a central axis of said yoke housing; and
        a plurality of capacitors arranged adjacent to a center of one of said flat side walls, wherein:

said plurality of brushes include two brushes;

said plurality of choke coils include two choke coils;

said plurality of capacitors include two capacitors;

each one of said two brushes is arranged in such a manner that a longitudinal axis of said each one of said two brushes extends perpendicular to said central axis of said yoke housing and generally coincides with a straight line extending through a center of each one of said arcuate side walls; and said two choke coils are arranged adjacent to a second one of said flat side walls.

17. A motor comprising:

an electrically conductive yoke housing configured in an oblate cylindrical cup form having two opposed flat side walls and two opposed arcuate side walls, each of which joins corresponding opposed lateral edges of said flat side walls together, said yoke housing having an open end at one end and receiving a plurality of brushes and a commutator; and a noise limiter circuit arranged at said open end of said yoke housing and smoothing electric power to be supplied to said plurality of brushes to restrain generation of electromagnetic noise between said plurality of brushes and said commutator, said noise limiter circuit including:

a plurality of helically wound cylindrical choke coils, each said choke coil being arranged adjacent to a corresponding corner of said yoke housing located between a corresponding one of said flat side walls and a corresponding one of said arcuate side walls in such a manner that said each choke coil extends substantially parallel to a central axis of said yoke housing; and a plurality of capacitors arranged adjacent to a center of one of said flat side walls, wherein:

said plurality of brushes include two brushes;

said plurality of choke coils include two choke coils;

said plurality of capacitors include two capacitors; and said two capacitors are arranged side by side along an internal surface of said one of said flat side walls.

* * * * *